United States Patent
Ogasawara et al.

(10) Patent No.: US 8,494,359 B2
(45) Date of Patent: Jul. 23, 2013

(54) IMAGING APPARATUS

(75) Inventors: Shinya Ogasawara, Hyogo (JP);
 Makoto Iyoda, Osaka (JP); Yoshikazu Yamano, Osaka (JP); Tomonori Mizutani, Osaka (JP); Yasuhiro Miyamoto, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 11 days.

(21) Appl. No.: 13/395,125

(22) PCT Filed: Jun. 29, 2011

(86) PCT No.: PCT/JP2011/003729
§ 371 (c)(1),
(2), (4) Date: Mar. 9, 2012

(87) PCT Pub. No.: WO2012/077253
PCT Pub. Date: Jun. 14, 2012

(65) Prior Publication Data
US 2012/0275778 A1    Nov. 1, 2012

(30) Foreign Application Priority Data
Dec. 6, 2010 (JP) ................. 2010-271859

(51) Int. Cl.
*G03B 17/02* (2006.01)
(52) U.S. Cl.
USPC .......... 396/535; 396/544; 396/419; 348/373; 248/187.1
(58) Field of Classification Search
USPC ...................................... 396/353
See application file for complete search history.

(56) References Cited

U.S. PATENT DOCUMENTS

| | | | | |
|---|---|---|---|---|
| 5,092,458 A | * | 3/1992 | Yokoyama | 206/316.2 |
| 7,128,297 B2 | * | 10/2006 | Lee | 248/187.1 |
| 7,316,337 B2 | * | 1/2008 | Botham et al. | 222/606 |
| 8,337,101 B2 | * | 12/2012 | Mizutani et al. | 396/439 |
| 2009/0029224 A1 | * | 1/2009 | Takahashi et al. | 429/34 |

FOREIGN PATENT DOCUMENTS

| | | | |
|---|---|---|---|
| JP | H02-044728 U | | 3/1990 |
| JP | H08-110823 A | | 4/1996 |
| JP | 11167162 A | * | 6/1999 |
| JP | 2001-125191 A | | 5/2001 |
| JP | 2007-127836 A | | 5/2007 |
| JP | 2007-281621 A | | 10/2007 |
| JP | 2008-145534 A | | 6/2008 |
| JP | 2009080420 A | * | 4/2009 |
| JP | 2010-093797 A | | 4/2010 |

* cited by examiner

*Primary Examiner* — Clayton E LaBalle
*Assistant Examiner* — Leon W Rhodes, Jr.
(74) *Attorney, Agent, or Firm* — Judge Patent Associates

(57) ABSTRACT

An imaging apparatus having a protection ring which protects a supporting device coupling section such that it is difficult for a user to touch the supporting device coupling section is provided. A supporting device can be coupled to a camera body, and the camera body includes a supporting device coupling section and a protection ring. The supporting device coupling section has a screw hole to which the supporting device can be coupled, and a supporting device coupling surface which is formed and exposed around the entrance of the screw hole. The protection ring includes a return spring which restricts the position of the protection ring, a return spring stopper which supports the return spring, and a supporting device contact surface which protrudes outward of the exposed surface formed around the entrance of the screw hole of the supporting device coupling section, in a direction toward a housing outside.

7 Claims, 10 Drawing Sheets

IMAGING APPARATUS

TECHNICAL FIELD

The present invention relates to an imaging apparatus to which a supporting device can be coupled.

BACKGROUND ART

As an imaging apparatus, for example, an interchangeable lens type digital camera is known (e.g., see Patent Literature 1). The camera described in Patent Literature 1 includes a lens unit and a camera body. The camera body includes an imaging element such as a CCD (Charge Coupled Device) image sensor, and a mirror box device located between the lens unit and the imaging element. The mirror box device guides light having passed through the lens unit, to the CCD image sensor or a prism. The light guided to the prism is guided to a finder by the prism.

The imaging apparatus described above may be provided with a supporting device coupling section for coupling a supporting device such as a tripod or a monopod. For example, an interchangeable lens type digital camera in which a supporting device coupling section is fixed to a bottom thereof is known. When a tripod for supporting a digital camera is coupled to the supporting device coupling section, an image can be taken while the attitude of the digital camera is stabilized.

CITATION LIST

Patent Literature

[PTL 1] Japanese Laid-Open Patent Publication No. 2007-127836

SUMMARY OF THE INVENTION

Problems to be Solved by the Invention

Conventionally, size reduction of imaging apparatuses are required. For example, for an interchangeable lens type digital camera, size reduction of the camera body is required. However, when the camera body is reduced in size, components are densely arranged. Thus, the distance between the supporting device coupling section and each of electronic components that generate heat, such as an imaging element and a substrate on which a camera controller is mounted, is small as compared to that in a conventional camera body.

Further, with enhancement of image quality, power consumption of an imaging element and a camera controller increases. Thus, amounts of heat generated by these electronic components increase. As a result, the heat generation densities around the electronic components increase, and heat generated by the electronic components may be transmitted to the supporting device coupling section to increase the temperature of the supporting device coupling section. Therefore, when a user touches the supporting device coupling section and senses the difference between the ambient temperature and the temperature of the supporting device coupling section, the user may feel discomfort. Meanwhile, in order to stably support the imaging apparatus with a supporting device, it is desirable to locate the supporting device near the supporting device coupling section that serves as a fulcrum. In other words, it is desirable that the supporting device coupling section is located at a position suitable for coupling the supporting device.

Therefore, an object of the present invention is to provide an imaging apparatus that solves the conventional problem and that has a supporting device coupling section located at a position suitable for coupling a supporting device and can reduce the possibility that a user will feel discomfort when touching the supporting device coupling section.

Solution to the Problems

The present invention is directed to an imaging apparatus to which a supporting device can be coupled. In order to achieve the object described above, the imaging apparatus of the present invention includes: a supporting device coupling section provided in a supporting device coupling surface of the imaging apparatus and having a screw hole; and a protection ring unit including a protection ring, an elastic member, and a stopper which supports the elastic member. The supporting device coupling section has an exposed surface formed around an entrance of the screw hole. The protection ring has a supporting device contact surface which protrudes outward of the exposed surface of the supporting device coupling section in a direction toward a housing outside due to an elastic force of the elastic member when the supporting device is not coupled to the supporting device coupling section. When the supporting device is coupled to the supporting device coupling section, the protection ring moves against the elastic force of the elastic member, whereby the supporting device and the supporting device coupling section are firmly fixed to each other.

The protection ring is located at a first position when the supporting device is coupled to the supporting device coupling section, and is located at a second position when the supporting device is coupled to the supporting device coupling section. When the protection ring is located at the first position, the exposed surface of the supporting device coupling section is located inward of the supporting device contact surface of the protection ring. When the protection ring is located at the second position, the exposed surface of the supporting device coupling section and the supporting device contact surface of the protection ring are located in a same plane.

The protection ring moves from the first position to the second position in conjunction with an operation to couple the supporting device to the supporting device coupling section. The protection ring moves from the second position to the first position in conjunction with an operation to remove the supporting device from the supporting device coupling section.

When the supporting device is not coupled to the supporting device coupling section, the elastic member applies an elastic force to the protection ring such that the protection ring is located at the first position. When the supporting device is coupled to the supporting device coupling section, the elastic member is contracted and the protection ring is located at the second position.

The protection ring is elastically connected to the supporting device coupling section due to the elastic member. When the supporting device is not coupled to the supporting device coupling section, the stopper restricts movement of the protection ring coupled to the elastic member, such that the protection ring is located at the first position. The stopper is formed of a part of a main frame of the imaging apparatus. The exposed surface and the supporting device come into contact with each other when the supporting device is coupled to the supporting device coupling section.

Advantageous Effects of the Invention

According to the above-described imaging apparatus according to the present invention, since the exposed surface is located inward of the supporting device contact surface of the protection ring when the supporting device is not coupled to the supporting device coupling section, the exposed surface can be located at a position where it is difficult for the user to touch. Therefore, the frequency with which the user touches the supporting device coupling section and senses the difference between the temperature of the supporting device coupling section and the ambient temperature is reduced. On the other hand, when the supporting device is coupled to the supporting device coupling section, the exposed surface and the supporting device contact surface of the protection ring are located in the same plane, or the supporting device coupling section protrudes from the outer surface, and thus the supporting device coupling section can be close to the supporting device. Therefore, the imaging apparatus has the supporting device coupling section located at a position suitable for coupling the supporting device and can reduce the possibility that the user will feel discomfort when touching the supporting device coupling section.

DESCRIPTION OF EMBODIMENTS

<1-1: Outline of Digital Camera>

Figure 1:
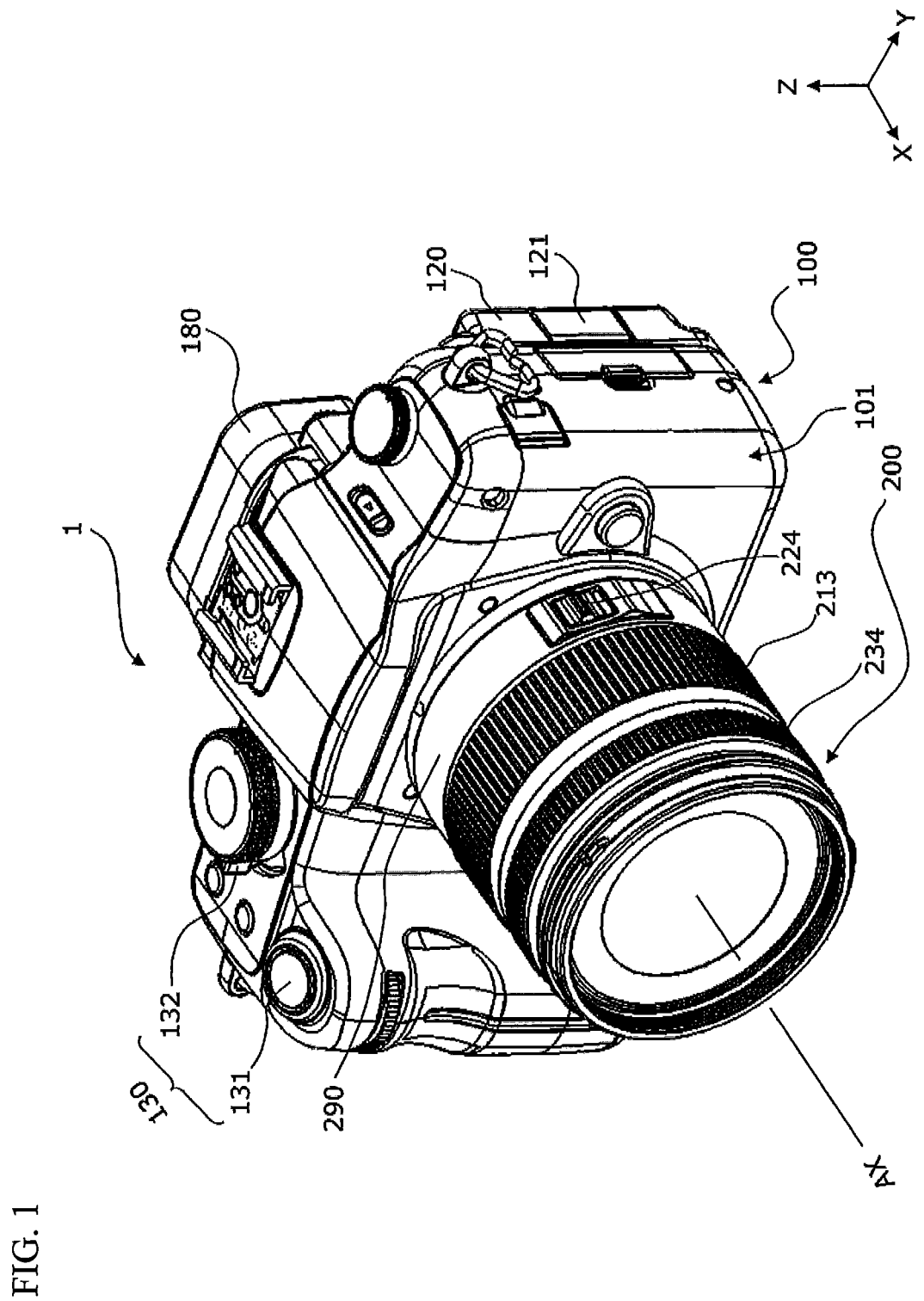
FIG. 1 is a perspective view of a digital camera 1.
Figure 2:
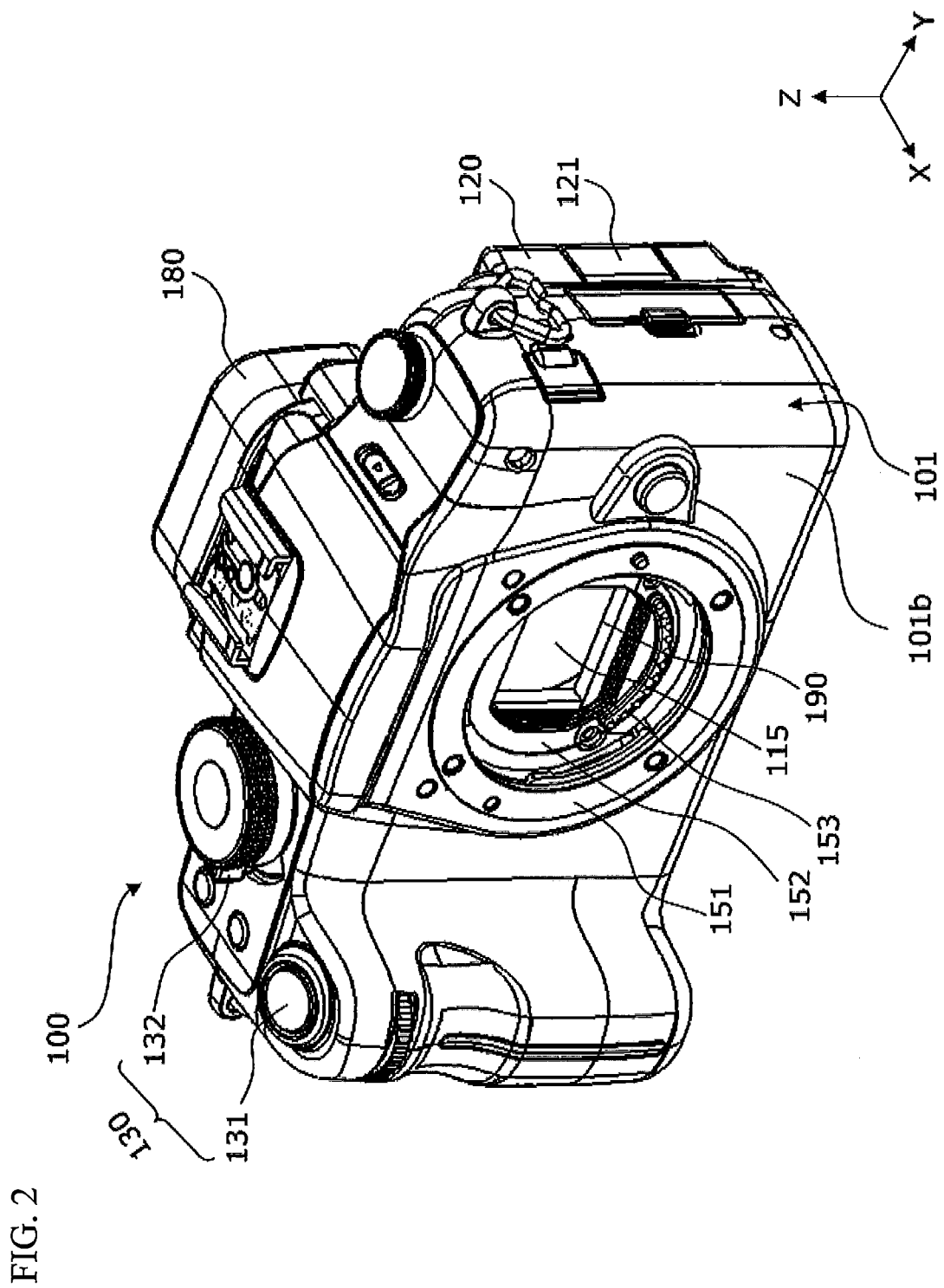
FIG. 2 is a perspective view of a camera body 100.
Figure 3:
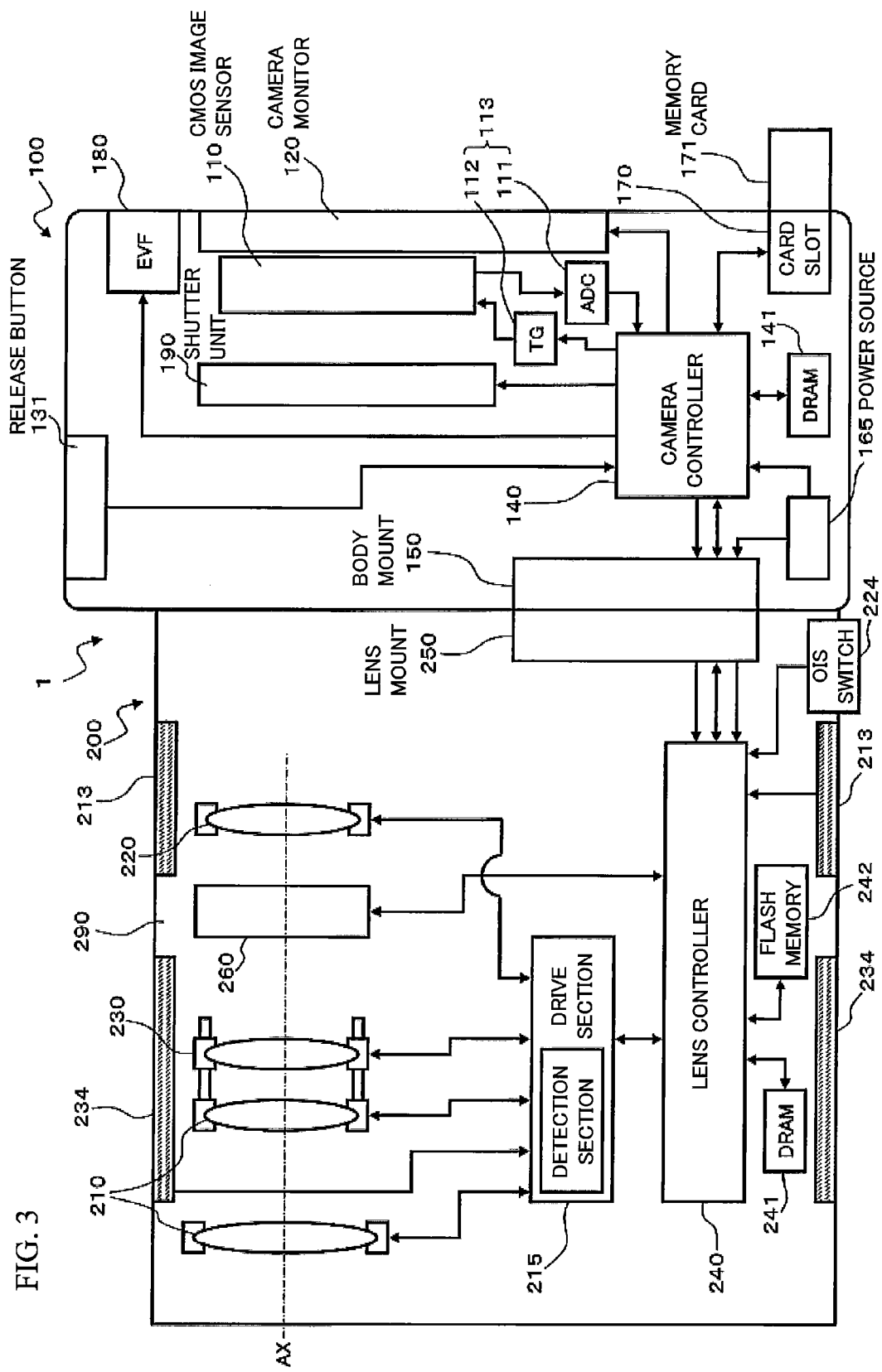
FIG. 3 is a block diagram of the digital camera 1.

FIG. 1 is a perspective view of a digital camera 1 (an example of an imaging apparatus) according to an embodiment of the present invention which has a camera body 100. FIG. 2 is a perspective view of the camera body 100. FIG. 3 is a functional block diagram of the digital camera 1.

Here, the imaging apparatus is not only an imaging apparatus capable of taking an image by itself but also a concept including a camera body. For example, the imaging apparatus includes the camera body of an interchangeable lens type camera to which a lens unit can be mounted. In addition, a supporting device is a fixing tool which is coupled to the imaging apparatus in order to stabilize the attitude of the imaging apparatus when an image is taken. As the supporting device, for example, a tripod and a monopod are considered.

The digital camera 1 is an interchangeable lens type digital camera for obtaining an image of an object, and includes the camera body 100 and a lens unit 200 which can be mounted to the camera body 100. Unlike a single-lens reflex camera, the camera body 100 does not include a mirror box device, and thus the flange back is small as compared to that in a conventional single-lens reflex camera. In addition, by decreasing the flange back, the camera body 100 is reduced in size. Further, by decreasing the flange back, flexibility in designing an optical system is increased, and thus the lens unit 200 is reduced in size. Hereinafter, each component will be described in detail.

For convenience of explanation, the object side of the digital camera 1 is referred to as front, the imaging surface side of the digital camera 1 is referred to as back, the vertical upper side in a normal attitude (hereinafter, also referred to as horizontal shooting attitude) of the digital camera 1 is referred to as up or upper side, and the vertical lower side is referred to as down or lower side. Here, the horizontal shooting attitude is an attitude in which when a direction parallel to the long sides of a horizontally oriented rectangular image coincides with the horizontal direction of an object within the image and a direction parallel to the short sides of the image coincides with the vertical direction of the object within the image, a direction in which a release button 131 (FIG. 1) is pressed when an image is taken substantially coincides with the vertical direction.

Additionally, the right side when the digital camera 1 is seen from a side opposite to an object in the horizontal shooting attitude of the digital camera 1 is referred to as right or right side. Similarly, the left side when the digital camera 1 is seen from the side opposite to the object in the horizontal shooting attitude of the digital camera 1 is referred to as left or left side. Further, the vertical direction in the horizontal shooting attitude of the digital camera 1 is referred to as up-down direction or height direction. Similarly, the direction of right and left in the horizontal shooting attitude of the digital camera 1 is referred to as right-left direction or lateral direction. Moreover, the direction perpendicular to the up-down direction and the right-left direction coincides with the front-back direction, a direction toward the object is referred to as forward direction, and the direction opposite to the forward direction is referred to as a backward direction.

Hereinafter, three-dimensional coordinate axes are set as shown in FIG. 1. In FIG. 1, an X-axis direction coincides with the front-back direction, a Y-axis direction coincides with the right-left direction, and a Z-axis direction coincides with the up-down direction. In addition, coordinate axes shown in the drawings other than FIG. 1 are based on the three-dimensional coordinate axes that are set in FIG. 1.

<1-2: Configuration of Camera Body>

Figure 4:
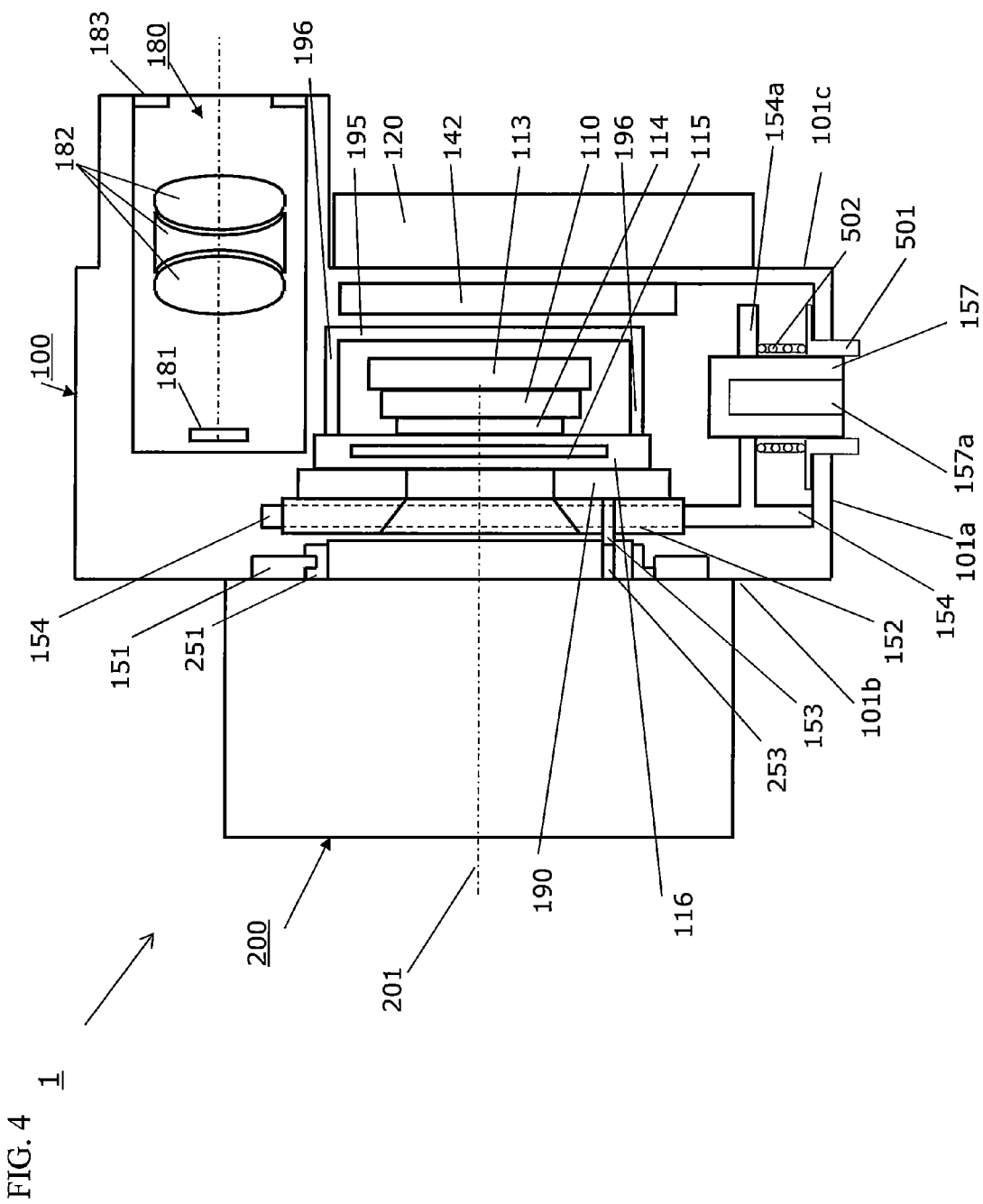
FIG. 4 is a schematic cross-sectional view of the digital camera 1.
Figure 5:
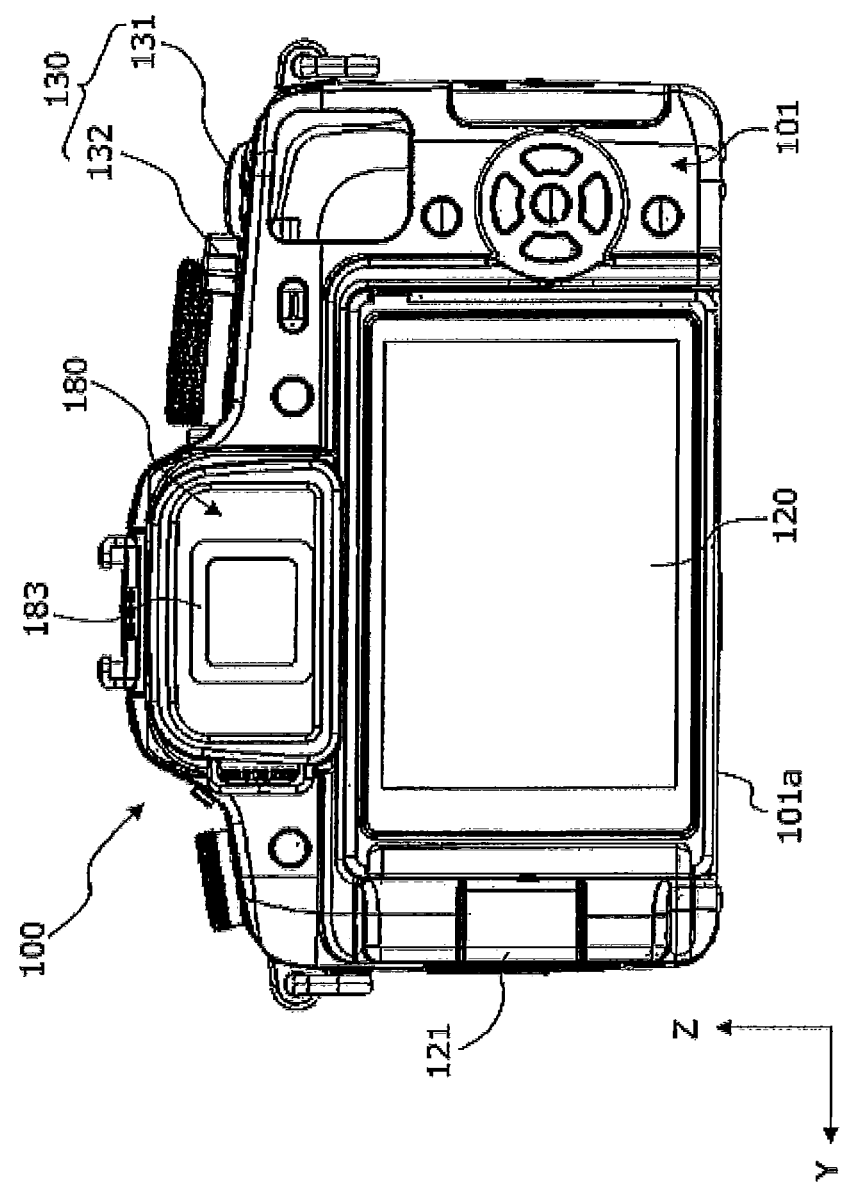
FIG. 5 is a back view of the camera body 100.

FIG. 4 is a schematic cross-sectional view of the digital camera 1. FIG. 5 is a back view of the camera body 100. The camera body 100 (an example of the imaging apparatus) mainly includes a CMOS (Complementary Metal Oxide Semiconductor) image sensor 110, a CMOS circuit substrate 113, a camera monitor 120, an operation section 130, a main circuit substrate 142 including a camera controller 140, a body mount 150, a power source 165, a card slot 170, an electric viewfinder (hereinafter, also referred to as EVF) 180, a shutter unit 190, an optical low-pass filter 114, a vibrating plate 115, a main frame 154, a supporting device coupling section 157, a heat dissipation member 198, and an exterior section 101.

<<Exterior Section>>

The exterior section 101 is a member that forms an outer surface of the camera body 100, and includes an exterior bottom portion 101a, an exterior front portion 101b, and an exterior back portion 101c. The exterior bottom portion 101a is located on the lower side of the CMOS image sensor 110 in the horizontal shooting attitude, the exterior front portion 101b is located on the object side, and the exterior back portion 101c is located on the photographer side.

In the camera body 100, the body mount 150, the shutter unit 190, the vibrating plate 115, the optical low-pass filter 114, the CMOS image sensor 110, the CMOS circuit substrate 113, a heat sink 195, the main circuit substrate 142, and the camera monitor 120 are located in order from front. In addition, a part of the main frame 154 is located at such a position as to overlap the body mount 150 in a direction parallel to an optical axis AX (hereinafter, also referred to as optical axis direction).

<<CMOS Image Sensor>>

The CMOS image sensor 110 converts an optical image (hereinafter, also referred to as object image) of an object incident through the lens unit 200, into image data. The generated image data is digitized by an AD converter 111 of the CMOS circuit substrate 113. The image data digitized by the AD converter 111 is subjected to various image processing by the camera controller 140. The various image processing is, for example, gamma correction processing, white balance adjustment processing, scratch correction processing, YC conversion processing, electronic zoom processing, JPEG compression processing, and the like. It should be noted that the function of the CMOS circuit substrate 113 may be included in the CMOS image sensor 110 or the main circuit substrate 142.

The CMOS image sensor 110 operates on the basis of a timing signal generated by a timing generator 112 of the CMOS circuit substrate 113. The CMOS image sensor 110 obtains still image data and moving image data under control of the CMOS circuit substrate 113. The obtained moving image data is also used for displaying a through-the-lens image. The still image data and the moving image data are examples of image data. Here, the through-the-lens image is an image of which data among the moving image data is not recorded in a memory card 171. The through-the-lens image is mainly a moving image and is displayed on the camera monitor 120 and/or the electric viewfinder 180 in order to determine the composition of a moving image or a still image.

The CMOS image sensor 110 is capable of obtaining a low-resolution moving image used as a through-the-lens image and obtaining a high-resolution moving image used for recording. As the high-resolution moving image, for example, a moving image having an HD size (high-vision size: 1920×1080 pixels) is considered. The CMOS image sensor 110 is an example of an imaging element which converts an optical image of an object into an electric image signal. As described above, the imaging element is an electronic component which generates an electric signal representing an image, and is a concept including the CMOS image sensor 110 as well as a photoelectric conversion element such as a CCD image sensor.

The CMOS circuit substrate 113 is a circuit substrate which controls the CMOS image sensor 110. In addition, the CMOS circuit substrate 113 is a circuit substrate which performs a predetermined process on image data outputted from the CMOS image sensor 110. The CMOS circuit substrate 113 includes the timing generator 112 and the AD converter 111. The CMOS circuit substrate 113 is an example of an imaging element circuit substrate which controls driving of the imaging element and performs a predetermined process such as AD conversion on image data outputted from the imaging element.

<<Camera Monitor>>

The camera monitor 120 is, for example, a liquid crystal display, and displays image and the like indicated by display image data. The display image data is generated by the camera controller 140. The display image data is, for example, image data subjected to image processing and data for displaying imaging conditions of the digital camera 1, an operation menu, and the like as an image. The camera monitor 120 is capable of selectively displaying a moving image and a still image.

The camera monitor 120 is provided to the camera body 100. In the present embodiment, the camera monitor 120 is located on the back surface of the camera body 100 but may be located at any position in the camera body 100. The angle of the display surface of the camera monitor 120 with respect to the camera body 100 is changeable. Specifically, as shown in FIG. 5, the camera body 100 includes a hinge 121 which pivotally connects the camera monitor 120 to the exterior section 101. The hinge 121 is located at the left edge of the exterior section 101. More specifically, the hinge 121 includes a first hinge and a second hinge. The camera monitor 120 is pivotable about the first hinge with respect to the exterior section 101 in the right-left direction, and is also pivotable about the second hinge with respect to the exterior section 101 in the up-down direction.

The camera monitor 120 is an example of a display section provided to the camera body 100. As the display section, a component that can display an image, such as an organic EL panel, an inorganic EL panel, or a plasma display panel, can also be used. In addition, the display section may be provided not on the back surface of the camera body 100 but on another location such as a side surface or an upper surface of the camera body 100.

<<Electric Viewfinder>>

The electric viewfinder (EVF) 180 displays an image and the like indicated by display image data that is created by the camera controller 140. The EVF 180 is capable of selectively displaying a moving image and a still image. In addition, the EVF 180 and the camera monitor 120 may display the same content and may display different contents. They are controlled by the camera controller 140. The EVF 180 includes an EVF crystal liquid monitor 181 which displays an image and the like, an EVF optical system 182 which enlarges a display of the EVF crystal liquid monitor 181, and an eyepiece window 183 to which a user makes their eye get close.

The EVF 180 is also an example of the display section. The difference from the camera monitor 120 is that the user makes their eye get close to the EVF 180 and looks at the EVF 180. The difference in structure is that the EVF 180 includes the eyepiece window 183 while the camera monitor 120 does not include the eyepiece window 183.

The EVF crystal liquid monitor 181 ensures a desired display brightness by providing a back light (not shown) in the case of a transmission type crystal liquid monitor and by providing a front light (not shown) in the case of a reflection type crystal liquid monitor. The EVF crystal liquid monitor 181 is an example of an EVF monitor. As the EVF monitor, a component that can display an image, such as an organic EL panel, an inorganic EL panel, or a plasma display panel, can also be used. In the case of a light-emitting device such as an organic EL panel, an illuminating light source is not necessary.

<<Operation Section>>

The operation section 130 receives an operation performed by the user. Specifically, as shown in FIGS. 1 and 2, the operation section 130 includes the release button 131 which receives a shutter operation performed by the user, and a power switch 132 which is a rotary dial switch provided on the upper surface of the camera body 100. The power switch 132 turns the power OFF at a first rotation position and turns the power ON at a second rotation position. The operation section 130 suffices to be capable of receiving an operation performed by the user, and includes a button, a lever, a dial, and a touch panel.

<<Camera Controller>>

The camera controller 140 is a device which serves as the functional center of the camera body 100, and controls each component of the camera body 100. For example, the camera controller 140 controls the shutter unit 190 such that the shutter unit 190 is kept in an open state when supply of power from the power source 165 is stopped. In addition, the camera controller 140 receives an instruction from the operation section 130. The camera controller 140 transmits a signal for controlling the lens unit 200, via the body mount 150 and a lens mount 250 to a lens controller 240 to indirectly control each component of the lens unit 200. In other words, the camera controller 140 controls the entirety of the digital camera 1.

Further, the camera controller 140 receives various signals via the body mount 150 and the lens mount 250 from the lens controller 240. The camera controller 140 uses a DRAM 141 as a work memory during a control operation or an image processing operation. The camera controller 140 is an example of a body control section (or a body microcomputer). The camera controller 140 is located on the main circuit substrate 142.

<<Card Slot and Memory Card>>

The memory card 171 is attachable to the card slot 170. The card slot 170 controls the memory card 171 on the basis of a control signal transmitted from the camera controller 140. Specifically, the card slot 170 stores still image data in the memory card 171. The card slot 170 outputs still image data from the memory card 171. In addition, the card slot 170 stores moving image data in the memory card 171. The card slot 170 outputs moving image data from the memory card 171.

The memory card 171 is capable of storing image data that the camera controller 140 generates by image processing. For example, the memory card 171 can store an uncompressed RAW image file and a compressed JPEG image file. In addition, the memory card 171 can output image data or image file previously stored therein, via the card slot 170. The image data or image file outputted from the memory card 171 is subjected to image processing by the camera controller 140. For example, the camera controller 140 performs extension processing on the image data or image file obtained from the memory card 171, to generate display image data.

The memory card 171 is further capable of storing moving image data that the camera controller 140 generates by image processing. For example, the memory card 171 can store a moving image file compressed according to H.264/AVC, which is a moving image compression standard. In addition, the memory card 171 can output moving image data or moving image file previously stored therein, via the card slot 170. The moving image data or moving image file outputted from the memory card 171 is subjected to image processing by the camera controller 140. For example, the camera controller 140 performs extension processing on the moving image data or moving image file obtained from the memory card 171, to generate display moving image data.

The memory card 171 is an example of a storage section. The storage section may be attachable to the camera body 100 like the memory card 171 or may be fixed to the digital camera 1.

<<Power Source>>

The power source 165 supplies power that is to be used in the digital camera 1, to each component. The power source 165 may be, for example, a dry battery or a rechargeable battery. Alternatively, the power source 165 may be a unit which receives power supplied from the outside via a power source cord or the like and supplies the power to the digital camera 1.

<<Body Mount>>

The lens unit 200 can be mounted to the body mount 150, and the body mount 150 includes a body mount ring 151 and an electric contact 153. The body mount 150 is mechanically and electrically connectable to the lens mount 250 of the lens unit 200.

The body mount ring 151 is a ring-shaped member provided to the exterior front portion 101b of the exterior section 101, and is engaged with a lens mount ring 251 provided in the lens unit 200, to mechanically support the lens unit 200. The lens mount ring 251 is engaged with the body mount ring 151 by a so-called bayonet mechanism. Specifically, depending on a rotation position relation about the optical axis between the lens mount ring 251 and the body mount ring 151, the lens mount ring 251 can be in a first state where the lens mount ring 251 is not engaged with the body mount ring 151 or in a second state where the lens mount ring 251 is engaged with the body mount ring 151.

More specifically, the lens mount ring 251 can be in the first state where the lens mount ring 251 is moveable in the optical axis direction with respect to the body mount ring 151. In such a first state, the lens mount ring 251 is capable of being inserted into the body mount ring 151. When the lens mount ring 251 is rotated with respect to the body mount ring 151 in the state of being inserted into the body mount ring 151, the lens mount ring 251 comes into engagement with the body mount ring 151. The rotation position relation between the body mount ring 151 and the lens mount ring 251 at that time is the second state.

In order to support the lens mount ring 251, the body mount ring 151 is required to have strength. Thus, the body mount ring 151 is preferably formed from metal. In the present embodiment, the body mount ring 151 is formed from metal.

In a state where the lens unit 200 is mounted to the camera body 100, the electric contact 153 is in contact with an electric contact 253 of the lens mount 250. In this manner, the body mount 150 and the lens mount 250 are electrically connectable to each other via the electric contact 153 of the body mount 150 and the electric contact 253 of the lens mount 250. Therefore, the digital camera 1 can transmit and receive at least either one of data or a control signal between the camera body 100 and the lens unit 200 via the body mount 150 and the lens mount 250. Specifically, the body mount 150 and the lens mount 250 can transmit and receive at least either one of data or a control signal between the camera controller 140 and the lens controller 240 included in the lens unit 200. In addition, the body mount 150 supplies the power received from the power source 165, to the entirety of the lens unit 200 via the lens mount 250.

The body mount 150 is supported by the main frame 154 via a body mount support portion 152. More specifically, the body mount support portion 152 is connected to the body mount ring 151 to support the body mount ring 151.

The body mount support portion 152 is supported by the main frame 154 and located between the body mount ring 151 and the shutter unit 190.

<<Shutter Unit>>

The shutter unit 190 is a so-called focal plane shutter, and is capable of blocking light to the CMOS image sensor 110. The shutter unit 190 is located between the body mount 150 and the CMOS image sensor 110. The shutter unit 190 includes a back screen, a front screen, and a shutter support frame. The shutter support frame is provided with an opening through which light guided from an object to the CMOS image sensor 110 passes. The shutter unit 190 adjusts an exposure time of the CMOS image sensor 110 by moving the back screen and the front screen toward or away from the opening of the shutter support frame. The shutter unit 190 can mechanically keep an open state. Mechanically keeping is a concept of keeping the open state without using electric power and includes, for example, keeping the open state by an engagement between a member and a member or by a permanent magnet.

<<Optical Low-Pass Filter and Diaphragm>>

The optical low-pass filter 114 removes a high-frequency component of light incident from an object. Specifically, the optical low-pass filter 114 separates an object image formed by the lens unit 200, such that the resolution is coarser than the pitch of the pixels of the CMOS image sensor 110. In general, in the imaging element such as the CMOS image sensor 110, color filters of RGB colors called Bayer arrangement or complementary color filters of YCM colors are arranged for each pixel. Therefore, when the object image is resolved to one pixel, false colors occur and a moiré phenomenon also occurs. The optical low-pass filter 114 also has an Ir cut filter function for cutting out infrared light.

The vibrating plate 115 is located in front of the CMOS image sensor 110, is supported by a vibrating plate support portion 116, and prevents dust from attaching to the CMOS image sensor 110. In addition, the vibrating plate 115 shakes off dust attached to the vibrating plate 115, by vibrations. Specifically, the vibrating plate 115 includes a transparent thin plate-shaped member, a piezoelectric element, and a fixing member which fixes the plate-shaped member via the piezoelectric element. When an alternating voltage is applied and the piezoelectric element vibrates, the plate-shaped member vibrates. The vibrating plate support portion 116 supports the vibrating plate 115 such that the vibrating plate 115 is located at a predetermined position with respect to the CMOS image sensor 110. The vibrating plate support portion 116 is supported by the main frame 154 via the body mount 150 and the shutter unit 190.

<<Heat Dissipation Member>>

The heat dissipation member 198 includes the heat sink 195 and a heat transmission portion 196. The heat sink 195 is located between the CMOS image sensor 110 and the main circuit substrate 142. Specifically, the heat sink 195 is located between the CMOS circuit substrate 113 and the main circuit substrate 142. The heat sink 195 is a rectangular plate-shaped member for dissipating heat generated by the CMOS image sensor 110. When metal such as aluminum or copper is used as the material of the heat sink 195, a preferable heat dissipation effect can be obtained.

The heat transmission portion 196 is connected to the heat sink 195 in order to transmit heat to the vibrating plate support portion 116. The heat transmission portion 196 is connected and fixed to the vibrating plate support portion 116. Heat generated by the CMOS image sensor 110 is transmitted via the heat sink 195 and the heat transmission portion 196 to the vibrating plate support portion 116. In order to enable such heat transmission, the heat sink 195 is located on the back surface of the CMOS image sensor 110 and the heat transmission portion 196 extends from the heat sink 195 to the vibrating plate support portion 116.

More specifically, the heat transmission portion 196 includes four plates extending forward from the upper and lower edges and the right and left edges of the heat sink 195. In other words, the heat transmission portion 196 is located so as to surround the upper, lower, right, and left portions of the CMOS image sensor 110. In this manner, the CMOS image sensor 110 is surrounded at the upper side, both lateral sides, the lower side, and the back side thereof by the heat sink 195 and the heat transmission portion 196.

The heat transmission portion 196 may not necessarily be connected to the vibrating plate support portion 116 and suffices to be connected to any component located between the main frame 154 and the CMOS image sensor 110. For example, it is considered that the heat transmission portion 196 is connected to the body mount support portion 152 or the shutter unit 190.

The heat transmission portion 196 is not necessarily connected at four locations to the vibrating plate support portion 116. For example, it suffices that at least one of the four plates connects the heat sink 195 to the vibrating plate support portion 116. However, in view of stability of the heat sink 195, the heat transmission portion 196 is desirably connected at three or more locations to the vibrating plate support portion 116.

<1-3: Configuration of Lens Unit>

The lens unit 200 can be mounted to the camera body 100, and forms an optical image of an object. The lens unit 200 mainly includes an optical system L, a drive section 215, the lens controller 240, the lens mount 250, a diaphragm unit 260, and a lens barrel 290.

The optical system L includes a zoom lens unit 210 for changing a focal distance of the optical system L, an OIS (Optical Image Stabilizer) lens unit 220 for reducing blur of an object image formed by the optical system L with respect to the CMOS image sensor 110, and a focus lens unit 230 for changing a focus state of an object image formed by the optical system L on the CMOS image sensor 110.

The diaphragm unit 260 is a light amount adjustment member which adjusts an amount of light passing through the optical system L. Specifically, the diaphragm unit 260 includes diaphragm blades (not shown) capable of blocking a part of a beam of light passing through the optical system L, and a diaphragm drive section 215 which drives the diaphragm blades.

The drive section 215 drives each lens unit (the zoom lens unit 210, the OIS lens unit 220, and the focus lens unit 230) of the optical system L on the basis of a control signal from the lens controller 240. In addition, the drive section 215 includes a detection section for detecting the position of each lens unit of the optical system L.

The lens mount 250 includes the lens mount ring 251 (not shown) and the electric contact 253 (not shown), and is mechanically and electrically connectable to the body mount 150 as described above.

The lens controller 240 controls the entirety of the lens unit 200 on the basis of a control signal transmitted from the camera controller 140. The lens controller 240 receives position information of each lens unit of the optical system L which is detected by the detection section included in the drive section 215, and transmits the position information to the camera controller 140. The camera controller 140 generates a control signal for controlling the drive section 215, on the basis of the received position information, and transmits the control signal to the lens controller 240. The lens controller 240 transmits the control signal generated by the camera controller 140, to the drive section 215. The drive section 215 adjusts the positions of the zoom lens unit 210, the OIS lens unit 220, and the focus lens unit 230 on the basis of the control signal.

Meanwhile, the camera controller 140 generates a control signal for operating the diaphragm unit 260, on the basis of information such as an amount of light received by the CMOS image sensor 110, whether still image shooting or moving image shooting is performed, and whether or not an operation for preferentially setting the F-number has been performed. At that time, the lens controller 240 relays the control signal generated by the camera controller 140, to the diaphragm unit 260.

Further, the lens controller 240 uses a DRAM 241 as a work memory when driving each lens unit of the optical system L and the diaphragm unit 260. In addition, a flash memory 242 has stored therein programs and parameters which are used by the lens controller 240.

The lens barrel 290 mainly accommodates therein the optical system L, the lens controller 240, the lens mount 250, and the diaphragm unit 260. In addition, a zoom ring 213, a focus ring 234, and an OIS switch 224 are provided to the outside of the lens barrel 290.

The zoom ring 213 is a cylindrical member, and is rotatable on the outer circumferential surface of the lens barrel 290. The zoom ring 213 is an example of an operation section for controlling the focal distance. When the zoom ring 213 is rotated, the focal distance of the optical system L is set in accordance with the position of the zoom ring 213 after the rotation. The position of the zoom ring 213 is detected by, for example, the detection section included in the drive section 215.

The focus ring 234 is a cylindrical member, and is rotatable on the outer circumferential surface of the lens barrel 290. The focus ring 234 is an example of an operation section for controlling a focus state of an object image formed by the optical system L on the CMOS image sensor 110. When the focus ring 234 is rotated, the focus state of the object image is adjusted in accordance with the position of the focus ring 234 after the rotation. For example, the lens controller 240 generates a control signal on the basis of position information of the focus ring 234, and outputs the control signal to the drive section 215. The drive section 215 drives the focus lens unit 230 on the basis of the control signal.

The OIS switch 224 is an example of an operation section for controlling an OIS. When the OIS switch 224 is turned OFF, the OIS does not operate. When the OIS switch 224 is turned ON, the OIS becomes operable.

<1-4: Features of Structure>

The camera body 100 does not include a mirror box device, and differs from a single-lens reflex camera in this point. Hereinafter, the structural features of the camera body 100 will be described in more detail with reference to FIGS. 6A and 6B.

Figure 6B:
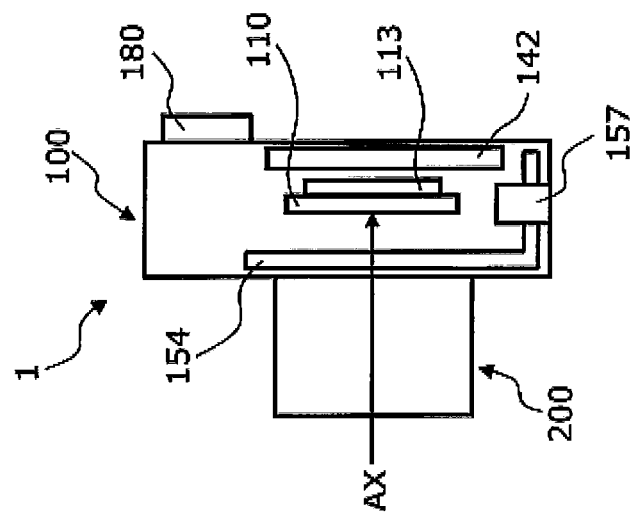
FIG. 6B is a schematic cross-sectional view of the digital camera 1.
Figure 6A:
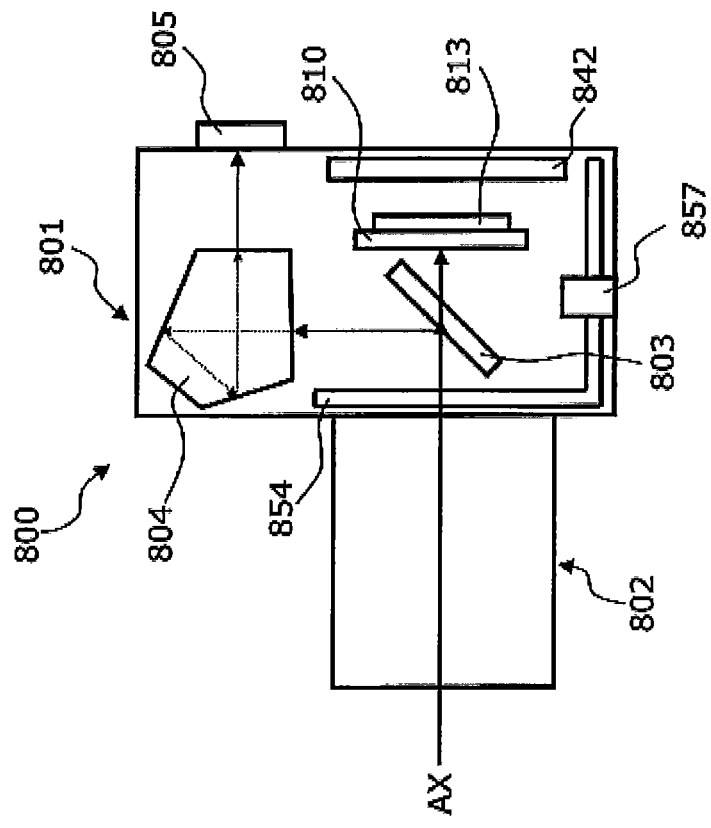
FIG. 6A is schematic cross-sectional view of a single-lens reflex camera 800.

FIG. 6A is a schematic cross-sectional view of a single-lens reflex camera 800. FIG. 6B is a schematic cross-sectional view of the digital camera 1 of the present embodiment. In FIG. 6B, components, such as the body mount 150, the shutter unit 190, the vibrating plate 115, the vibrating plate support portion 116, the heat sink 195, and the heat transmission portion 196, are omitted. In addition, in FIG. 6B, the details of a structure around the supporting device coupling section 157 are also omitted.

In the single-lens reflex camera 800 shown in FIG. 6A, a mirror box device is located in front of a CMOS image sensor 810, namely, with respect to a lens unit 802 side of the CMOS image sensor 810. The mirror box device includes a reflection mirror 803 and a pentaprism 804. On the back surface of the CMOS image sensor 810 (namely, on the opposite side of the CMOS image sensor 810 with respect to the lens unit 802), a CMOS circuit substrate 813 and a main circuit substrate 842 including a camera controller 840 are located in order from front. In addition, a main frame 854 made of metal is located along an inner surface of front and bottom portions of a camera body 801 in order to ensure desired strength of the camera body 801. Moreover, a supporting device coupling section 857 is provided at the bottom surface of the camera body 801 and fixed to the main frame 854.

In the single-lens reflex camera 800, an optical image of an object formed by the lens unit 802 is guided to the CMOS image sensor 810 or an optical finder 805 by the reflection mirror 803 and the pentaprism 804 included in the mirror box device. As described above, a space for locating the moveable reflection mirror 803 and the pentaprism 804 and a space for an optical path from the reflection mirror 803 to the optical finder 805 need to be ensured within the camera body 801, and thus the camera body 801 is not suitable for size reduction.

On the other hand, due to the reasons such as many spaces within the camera body 801 and a large surface area of the camera body 801, it is easy to dissipate heat generated by the CMOS image sensor 810 in the single-lens reflex camera 800. In addition, the supporting device coupling section 857 can be located at a position distant from the CMOS image sensor 810, and thus it is relatively difficult to transmit heat generated by the CMOS image sensor 810, to the supporting device coupling section 857.

Meanwhile, as shown in FIG. 6B, in the digital camera 1 according to the present embodiment, a mirror box device is not located on the front side of the CMOS image sensor 110. Thus, it is possible to shorten the flange back, and hence it is possible to reduce the camera body 100 in size. In addition, since the flange back is short, flexibility in designing the optical system L is increased, and thus it is possible to reduce the lens unit 200 in size. Therefore, omission of a mirror box device allows the digital camera 1 to be reduced in size.

On the other hand, although the camera body 100 can be reduced in size since a space in which a mirror box device is provided as in the single-lens reflex camera 800 is unnecessary, components are densely arranged in the digital camera 1. Thus, the distance between the CMOS image sensor 110 and the supporting device coupling section 157 is relatively small as compared to that in the single-lens reflex camera 800. In addition, power consumption of the CMOS image sensor 110 and the camera controller 140 is increased in order to enhance image quality and to support moving image shooting, and thus amounts of heat generated by the CMOS image sensor 110 and the camera controller 140 increase.

For example, the CMOS image sensor 110 which also supports taking a high-resolution moving image is used in the digital camera 1, and thus the power consumption thereof increases by about three times (from 0.4 W to 1.2 W) as compared to that of a CMOS image sensor that does not support taking a high-resolution moving image (for example, the CMOS image sensor 810 of the single-lens reflex camera 800). As a result, the amount of heat generated by the CMOS image sensor 110 increases as compared to an amount of heat generated by a CMOS image sensor that does not support taking a high-resolution moving image.

As described above, in the digital camera 1, amounts of heat generated by electronic components such as the CMOS image sensor 110 and the camera controller 140 increase as compared to those in the single-lens reflex camera 800. In addition, with size reduction, the supporting device coupling section 157 is located close to the CMOS image sensor 110. Thus, it is easy to transmit heat generated by the CMOS image sensor 110, to the supporting device coupling section 157. Therefore, the user who touches the supporting device coupling section 157 and senses the difference between the ambient temperature and the temperature of the supporting device coupling section 157, may feel discomfort.

<1-5: Coupling and Removal of Supporting Device>

Thus, in the digital camera 1 according to the present embodiment, the supporting device coupling section 157 is located at a position where it is difficult for the user to touch. Specifically, when a supporting device 550 is not coupled to the supporting device coupling section 157, the supporting device coupling section 157 is located inward of a protection ring. As a result, a supporting device coupling surface 157b is located at a position where it is difficult for the user to touch.

Figure 7:
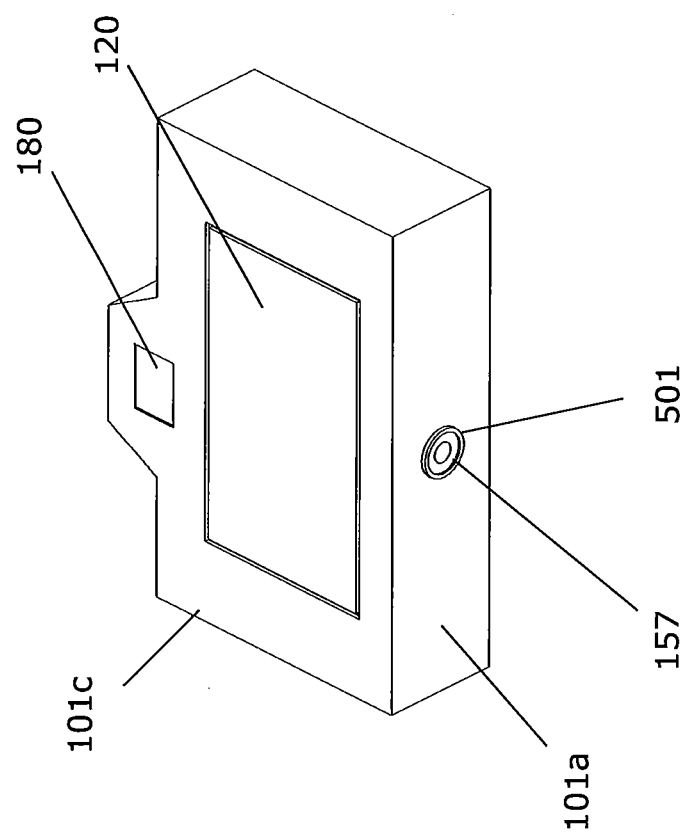
FIG. 7 is a schematic diagram of the digital camera 1.
Figure 8:
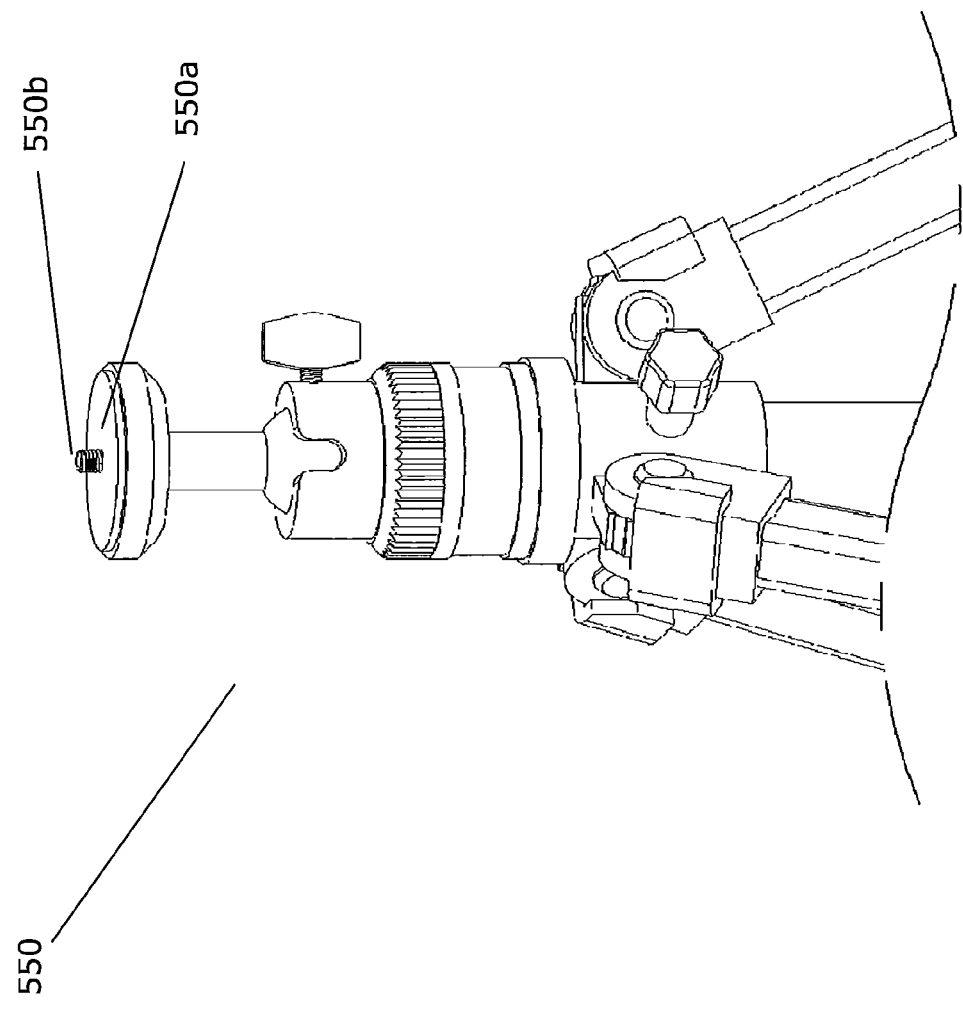
FIG. 8 is a diagram illustrating a supporting device.
Figure 9:
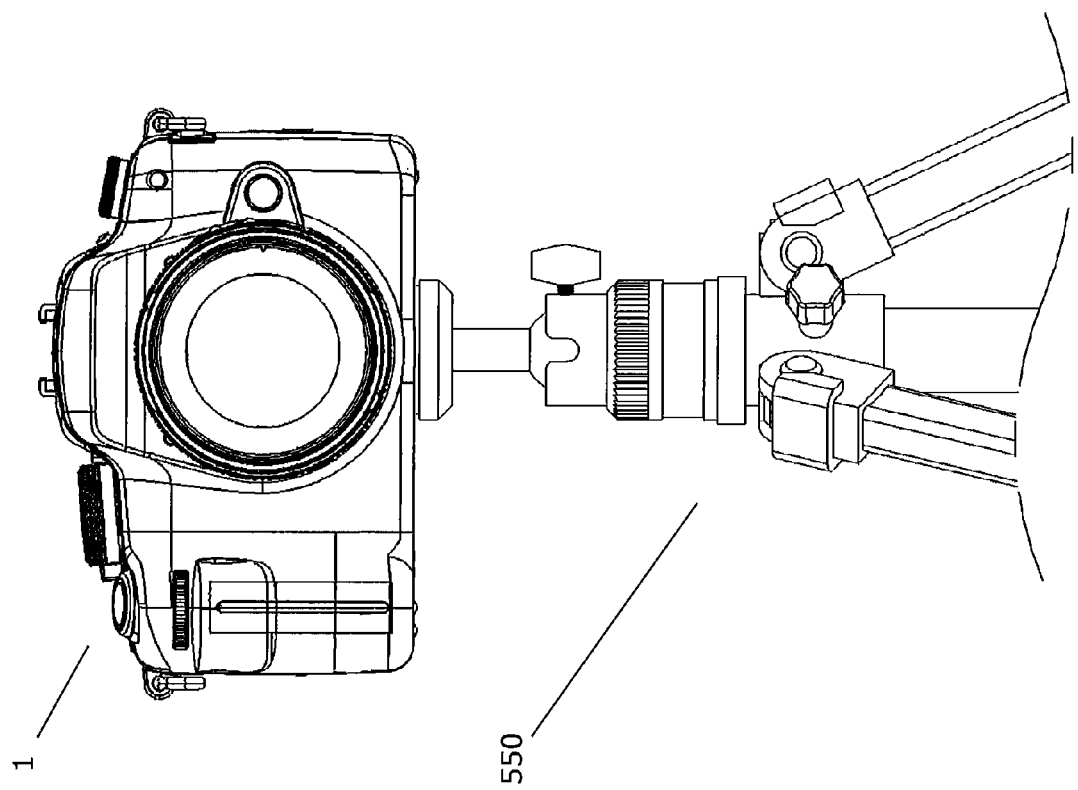
FIG. 9 is a diagram illustrating a state where the digital camera is mounted to the supporting device.

FIG. 7 is a perspective view of the digital camera 1. As shown in FIG. 7, the supporting device coupling section 157 and a protection ring 501 are located in the exterior bottom portion 101a of the digital camera 1. FIG. 8 is a diagram illustrating a tripod that is an example of the general supporting device 550. As shown in FIG. 8, the supporting device 550 has a supporting device fixing surface 550a and a screw 550b. FIG. 9 is a diagram illustrating a state where the digital camera 1 of the present embodiment is mounted to the supporting device 550. Here, the supporting device 550 is a fixing tool which is coupled to an imaging apparatus in order to stabilize the attitude of the imaging apparatus when an image is taken. As the supporting device 550, for example, a tripod and a monopod are considered.

<<Supporting Device Coupling Section>>

The supporting device coupling section 157 is a member for coupling the supporting device 550 such as a tripod, and is firmly connected to the main frame 154. The supporting device coupling section 157 has a screw hole 157a with which the screw 550b of the supporting device 550 is engageable, and a supporting device coupling surface 157b. The supporting device coupling surface 157b is an end surface of the supporting device coupling section 157, and is located so as to be able to be exposed to the outside and thus can be described as an exposed surface. In addition, the supporting device coupling surface 157b is formed around the screw hole 157a.

The screw hole 157a is located so as to be able to be exposed to the outside and is provided such that the screw 550b of the supporting device 550 can be coupled thereto. Specifically, when the supporting device 550 is not coupled, the screw hole 157a is exposed to the external air. The user can insert the screw 550b of the supporting device 550 into the screw hole 157a. The screw hole 157a has a center line CL. Hereinafter, a direction parallel to the center line CL is referred to as center line CL direction.

The screw 550b of the supporting device 550 is inserted into the screw hole 157a along the center line CL direction. A relatively great force is applied to the screw hole 157a via the screw 550b provided in the supporting device 550, and thus the supporting device coupling section 157 needs to have a certain level of strength. Therefore, the supporting device coupling section 157 is preferably formed from metal. Meanwhile, in order to suppress increase in the temperature of the supporting device coupling section 157, the supporting device coupling section 157 is desirably formed from metal having a relatively low heat conductivity. As a material that satisfies these conditions regarding strength and heat conductivity, for example, a stainless alloy is considered.

As shown in FIG. 4, the supporting device coupling section 157 is located on the lower side of the CMOS image sensor 110 and aligned along the Z-axis direction with the CMOS image sensor 110. When the supporting device coupling section 157 is located as described above, even if a component having a relatively heavy weight (for example, the lens unit 200) is located around the CMOS image sensor 110, a bias is unlikely to occur in a weight distribution around the supporting device coupling section 157. As a result, the digital camera 1 is easily stabilized when the supporting device is coupled thereto.

<<Protection Ring Unit>>

Figure 10A:
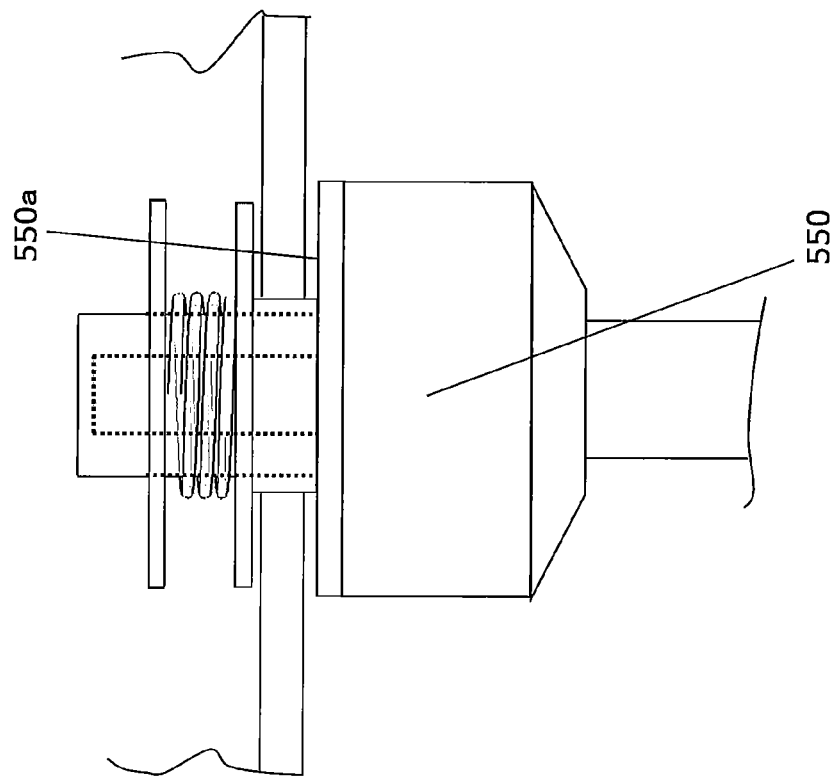
FIG. 10A is a partially enlarged cross-sectional view of the digital camera 1 before the supporting device is coupled.
Figure 10B:
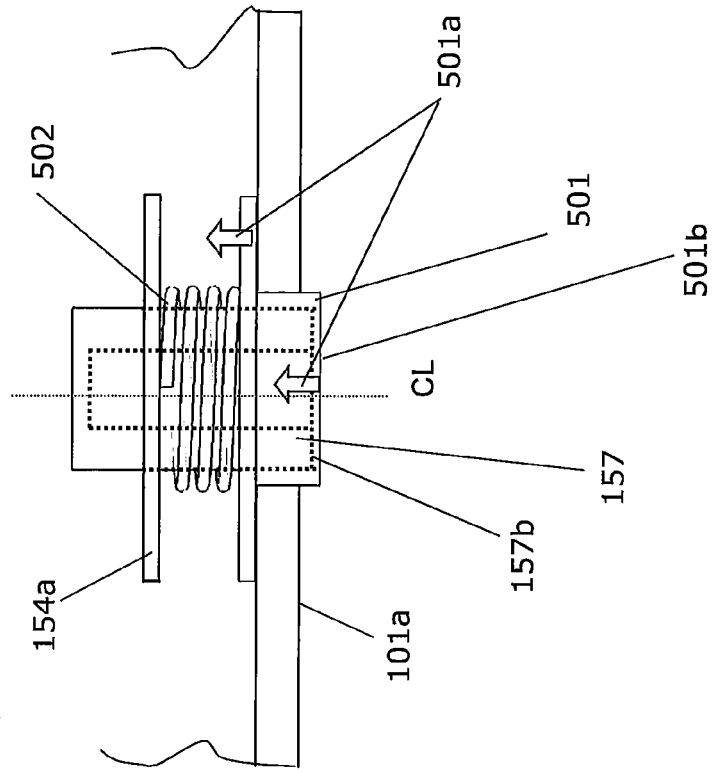
FIG. 10B is a partially enlarged cross-sectional view of the digital camera 1 after the supporting device is coupled.

As shown in FIGS. 4, 10A, and 10B, a protection ring unit is composed of the protection ring 501, a return spring 502, and a return spring stopper 154a. In the present embodiment, the return spring stopper 154a is a part of the main frame 154 but may be a member independent of the main frame 154. The return spring 502 is an elastic member which restricts the position of the protection ring 501 to the outside of the housing. Both ends of the return spring 502 constantly apply loads to the protection ring 501 and the return spring stopper 154a. In the present embodiment, the return spring stopper 154a is connected to the supporting device coupling section 157, but may not be connected thereto as long as it can restrict the position of the return spring 502. The protection ring 501 is moveable in the direction of the center axis of the cylinder of the supporting device coupling section 157 and pressed by the return spring 502 in a direction toward the exterior bottom portion 101a. When a load is applied in a direction perpendicular to a supporting device contact surface 501b, the protection ring 501 moves in the housing inward direction to be able to be substantially flush with the supporting device coupling surface 157b of the supporting device coupling section 157. In addition, when no load is applied, the protection ring 501 can return by the return spring 502 again to the position where the protection ring 501 is pressed in the direction toward the exterior bottom portion 101a.

Hereinafter, the structure of the supporting device coupling section 157 of the present embodiment will be described in more detail. FIGS. 10A and 10B are schematic diagrams illustrating a structure around the supporting device coupling section 157. FIG. 10A is a cross-sectional view of the supporting device coupling section 157 and the protection ring unit when the supporting device 550 is not coupled. FIG. 10B is a cross-sectional view of the supporting device coupling section 157 and the protection ring unit when the supporting device 550 is coupled.

In the digital camera 1 according to the present embodiment, as shown in FIG. 10A, when the supporting device 550 is not coupled, the supporting device contact surface 501b of the protection ring 501 is located outward of the supporting device coupling surface 157b due to the load of the return spring 502 (an example of an elastic member) (the position of the protection ring 501 at that time is referred to as first position). Thus, the protection ring 501 does not move when the supporting device coupling section 157 is touched from the outside with a hand of a person, and hence the supporting device coupling surface 157b is prevented from being easily touched. As shown in FIG. 10B, when the supporting device 550 is coupled, the protection ring 501 moves against the spring force of the return spring 502 in the direction toward a protection ring moveable direction 501a due to a force of the screw 550b screwed into the screw hole 157a, and the supporting device contact surface 501b is located so as to be substantially flush with the supporting device coupling surface 157b (the position of the protection ring 501 at that time is referred to as second position). Thus, the supporting device coupling surface 157b and the supporting device fixing surface 550a are firmly in close contact with each other and the supporting device 550 and the digital camera 1 are fixed to each other as if being integrated with each other. On the other hand, when the supporting device 550 is removed, the screw 550b is rotated in the direction opposite to that when coupling, whereby the supporting device coupling surface 157b and the supporting device fixing surface 550a are released from the close contact state and can be separated from each other. In addition, the protection ring 501 can also return to the state of FIG. 10A due to a shape restoring force of the return spring 502.

<1-6: Advantageous Effects>

Here, advantageous effects of the camera body 100 according to the present embodiment will be summarized.

(1)

In the camera body 100, since the supporting device coupling surface 157b is located inward of the supporting device contact surface 501b when the supporting device 550 is not coupled to the supporting device coupling section 157, the supporting device coupling section 157 can be located at a position where it is difficult for the user to touch. Therefore, the frequency with which the user touches the supporting device coupling section 157 and senses the difference between the temperature of the supporting device coupling section 157 and the ambient temperature can be reduced. Meanwhile, the protection ring 501 is supported so as to be moveable with respect to the supporting device coupling section 157, and when the supporting device 550 is coupled to the supporting device coupling section 157, the supporting device coupling surface 157b and the supporting device contact surface 501b are located in the same plane. Thus, the supporting device coupling section 157 can be close to the supporting device 550.

As described above, the possibility that the user will feel discomfort when touching the supporting device coupling section 157 can be reduced, and the supporting device coupling section 157 can be located at a position suitable for coupling the supporting device.

(2)

In the camera body 100, the protection ring 501 moves in conjunction with an operation to remove the supporting device coupling section 157. Thus, an extra operation of the user is not required, and the supporting device coupling section 157 can be protected such that it is difficult for the user to touch the supporting device coupling section 157. Specifically, the protection ring 501 is elastically connected to the supporting device coupling section 157 due to the return spring 502, and when the supporting device 550 is not coupled, the protection ring 501 is pressed against the surface opposed to the exterior bottom portion 101a. Therefore, when the supporting device 550 is not coupled, the protection ring 501 is held by the return spring 502. Moreover, when the supporting device 550 is removed from the supporting device coupling section 157, the protection ring 501 automatically moves to the initial position due to the return spring 502, and thus an extra operation of the user can be omitted.

(3)

In the camera body 100, the supporting device fixing portion 157 is formed from metal and is further fixed to the frame 154 formed from metal. Thus, desired strength in a supporting device fixed state can be ensured.

INDUSTRIAL APPLICABILITY

The technology described herein can be used for locating the supporting device coupling section at a position where it is difficult for the user to touch, and the like, and is applicable to an imaging apparatus to which a supporting device can be coupled, and the like. Specifically, the technology described herein is applicable to a digital still camera, a digital video camera, and the like.

DESCRIPTION OF THE REFERENCE CHARACTERS

1 digital camera (an example of imaging apparatus)
100 camera body (an example of imaging apparatus)
101 exterior section
101a exterior bottom portion
101b exterior front portion
101c exterior back portion
110 CMOS image sensor
111 AD converter
112 timing generator
113 CMOS circuit substrate
114 optical low-pass filter
115 vibrating plate
116 vibrating plate support portion
120 camera monitor
121 hinge
130 operation section
131 release button
132 power switch
140 camera controller
141 DRAM
142 main circuit substrate
150 body mount
151 body mount ring
152 body mount support portion
153 electric contact
154 main frame
154a return spring stopper
157 supporting device coupling section
157a screw hole
157b supporting device coupling surface
162 outer surface
165 power source
170 card slot
171 memory card
180 electric viewfinder (EVF)
181 EVF crystal liquid monitor
182 EVF optical system
183 eyepiece window
190 shutter unit
195 heat sink
196 heat transmission portion
200 lens unit
210 zoom lens
213 zoom ring
215 drive section
220 OIS lens
224 OIS switch
230 focus lens
234 focus ring
240 lens controller
241 DRAM
242 flash memory
250 lens mount
251 lens mount ring
253 electric contact (body side)
260 diaphragm unit
290 lens barrel
501 protection ring
501a protection ring moveable direction
501b supporting device contact surface
502 return spring (an example of elastic member)
550 supporting device
550a supporting device fixing surface
550b screw
800 single-lens reflex camera
801 camera body
802 lens unit
803 reflection mirror
804 pentaprism 805 optical finder
810 CMOS image sensor
813 CMOS circuit substrate
842 main circuit substrate
854 main frame
857 supporting device coupling section

The invention claimed is:

1. An imaging apparatus to which a supporting device can be coupled, the imaging apparatus comprising:
a supporting device coupling section provided in a supporting device coupling surface of the imaging apparatus and having a screw hole; and
a protection ring unit including a protection ring, an elastic member, and a stopper which supports the elastic member, wherein
the supporting device coupling section has an exposed surface formed around an entrance of the screw hole,
the protection ring has a supporting device contact surface which protrudes outward of the exposed surface of the supporting device coupling section in a direction toward a housing outside due to an elastic force of the elastic member when the supporting device is not coupled to the supporting device coupling section, and
when the supporting device is coupled to the supporting device coupling section, the protection ring moves against the elastic force of the elastic member, whereby the supporting device and the supporting device coupling section are firmly fixed to each other.

2. The imaging apparatus according to claim 1, wherein
the protection ring is located at a first position when the supporting device is not coupled to the supporting device coupling section, and is located at a second position when the supporting device is coupled to the supporting device coupling section,
when the protection ring is located at the first position, the exposed surface of the supporting device coupling section is located inward of the supporting device contact surface of the protection ring, and
when the protection ring is located at the second position, the exposed surface of the supporting device coupling section and the supporting device contact surface of the protection ring are located in a same plane.

3. The imaging apparatus according to claim 2, wherein
the protection ring moves from the first position to the second position in conjunction with an operation to couple the supporting device to the supporting device coupling section, and
the protection ring moves from the second position to the first position in conjunction with an operation to remove the supporting device from the supporting device coupling section.

4. The imaging apparatus according to claim 2, wherein
when the supporting device is not coupled to the supporting device coupling section, the elastic member applies an elastic force to the protection ring such that the protection ring is located at the first position, and
when the supporting device is coupled to the supporting device coupling section, the elastic member is contracted and the protection ring is located at the second position.

5. The imaging apparatus according to claim 2, wherein
the protection ring is elastically connected to the supporting device coupling section due to the elastic member, and
when the supporting device is not coupled to the supporting device coupling section, the stopper restricts movement of the protection ring coupled to the elastic member, such that the protection ring is located at the first position.

6. The imaging apparatus according to claim 1, wherein the stopper is formed of a part of a main frame of the imaging apparatus.

7. The imaging apparatus according to claim 1, wherein the exposed surface and the supporting device come into contact with each other when the supporting device is coupled to the supporting device coupling section.

* * * * *